Feb. 16, 1965  PER-OSKAR PERSSON  3,169,381
FLUIDIZED FREEZER
Filed April 13, 1964  8 Sheets-Sheet 3
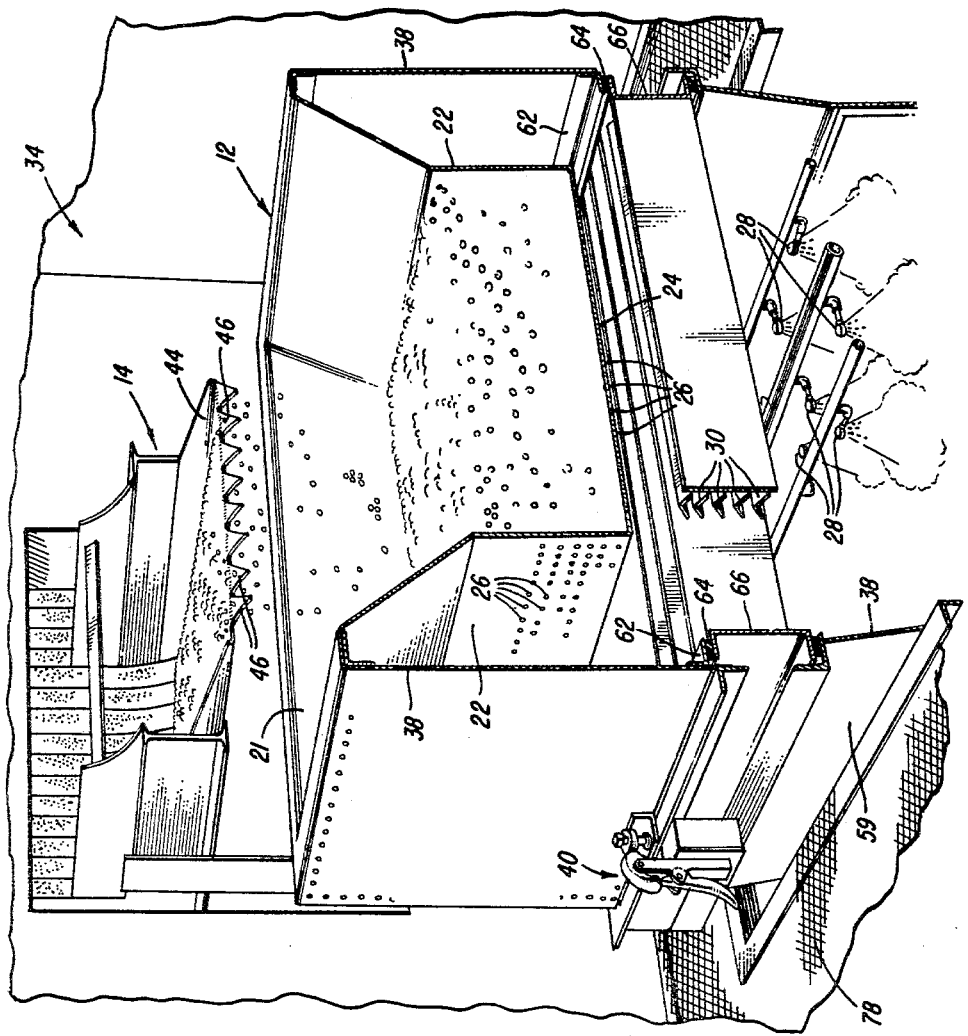
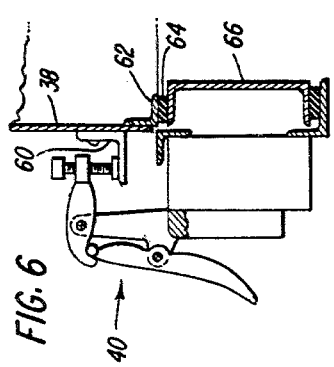
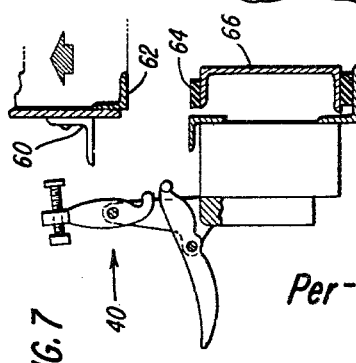
INVENTOR
*Per-Oskar Persson*
BY  *Karl W. Flocks*
ATTORNEY

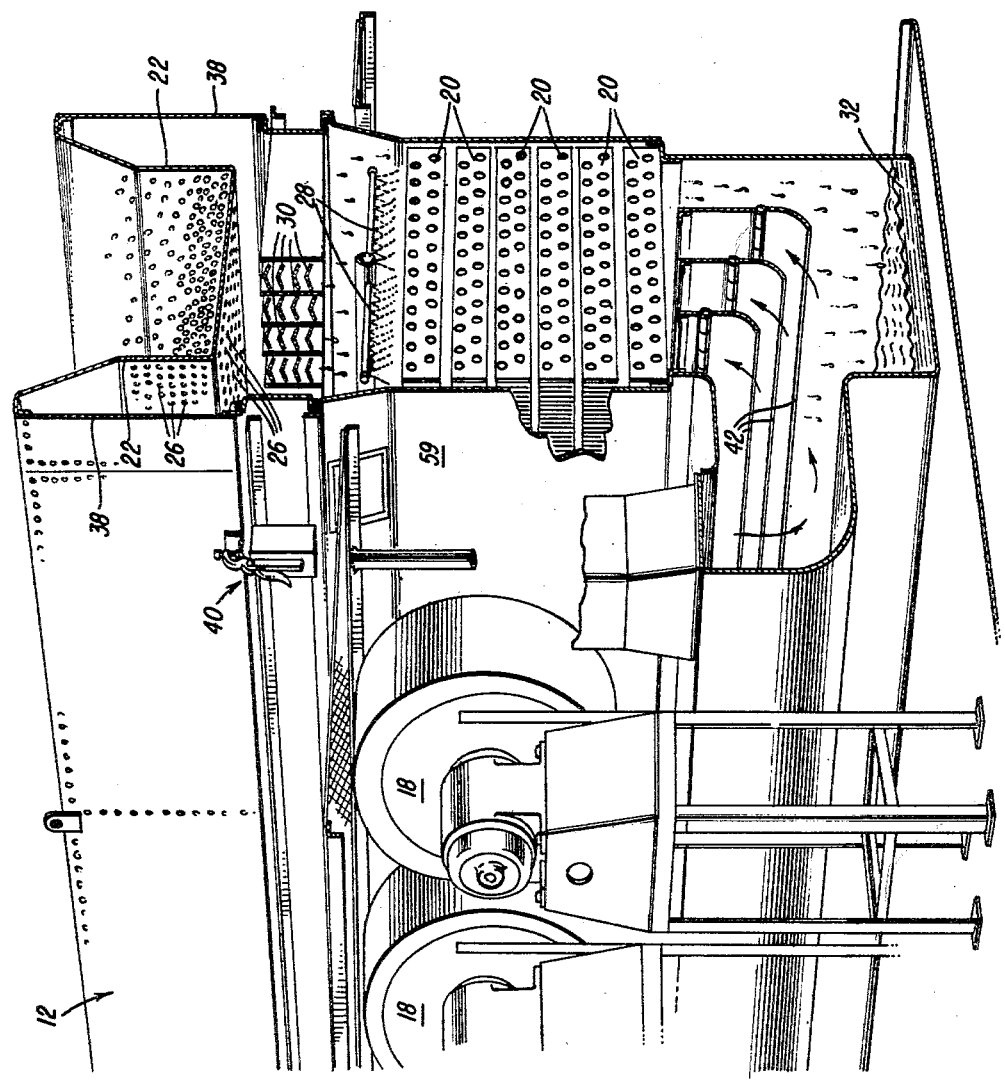

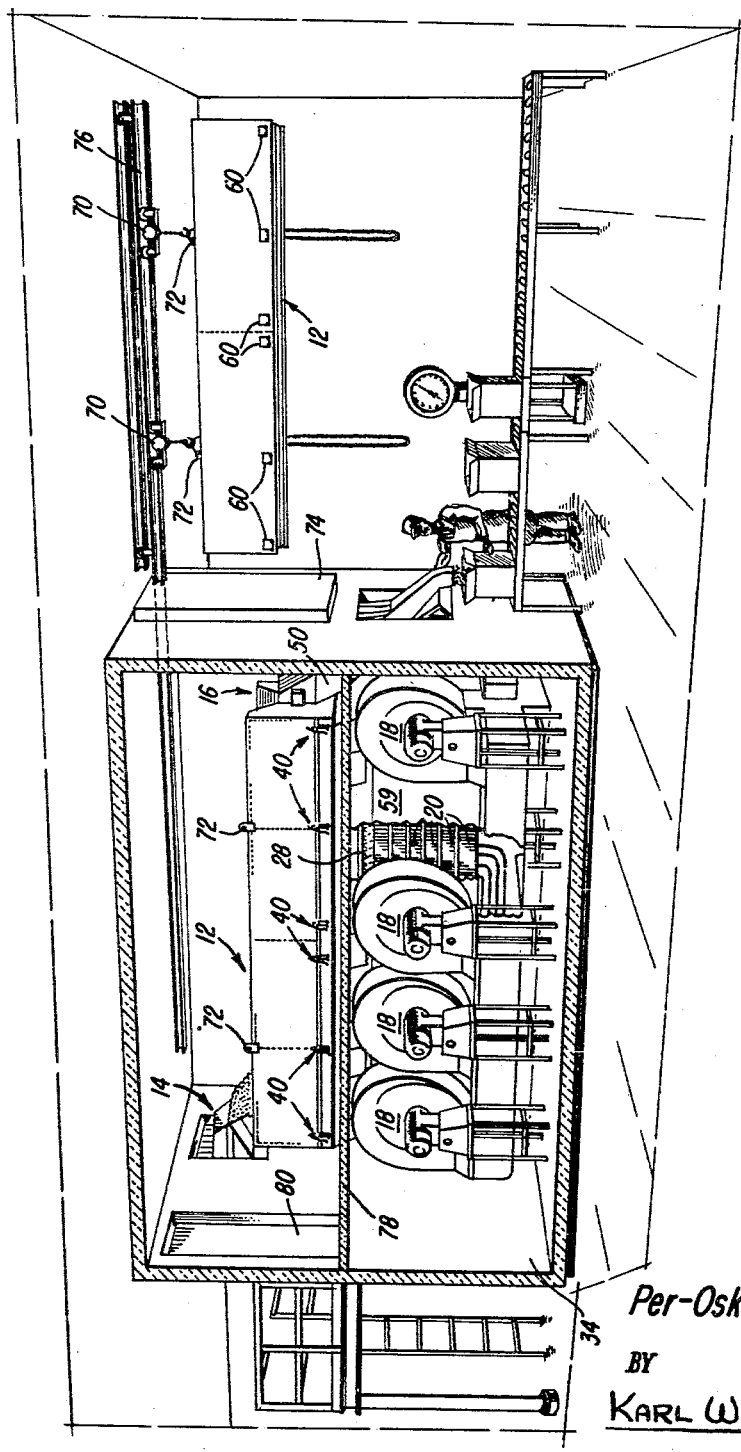

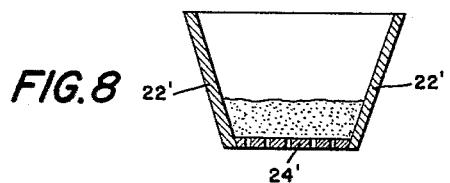
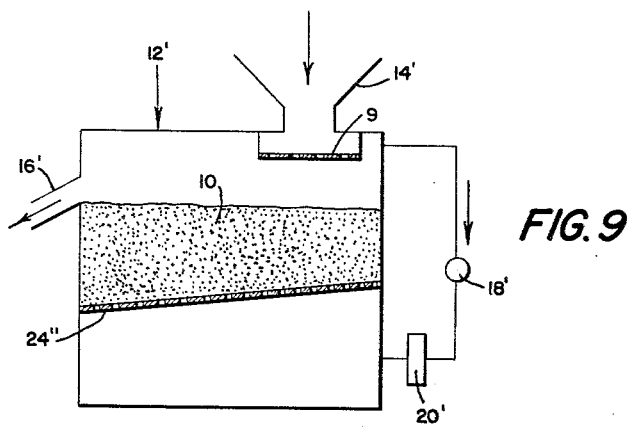
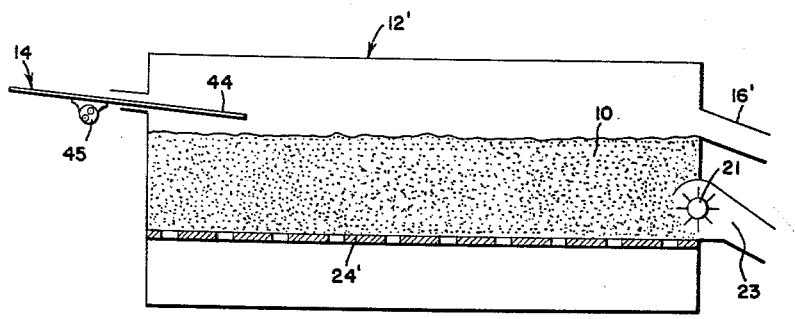

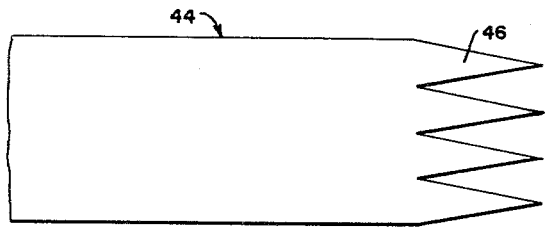
FIG.11
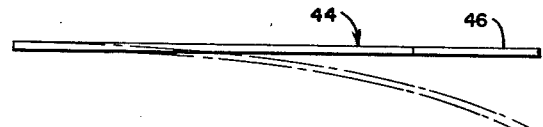
FIG.12
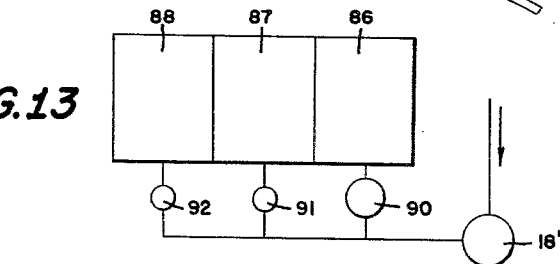
FIG.13
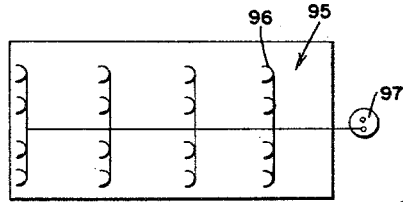
FIG.14
FIG.15

Feb. 16, 1965 PER-OSKAR PERSSON 3,169,381
FLUIDIZED FREEZER
Filed April 13, 1964 8 Sheets-Sheet 8

INVENTOR
PER-OSKAR PERSSON

BY *Karl W. Flocks*

ATTORNEY

United States Patent Office 3,169,381
Patented Feb. 16, 1965

3,169,381
FLUIDIZED FREEZER
Per-Oskar Persson, Viken, Sweden, assignor to Frigoscandia Ltd., London, England, a corporation of Great Britain
Filed Apr. 13, 1964, Ser. No. 359,244
27 Claims. (Cl. 62—57)

This is a continuation-in-part of abandoned application Serial No. 150,541, filed November 6, 1961, and of application Serial No. 243,864, filed December 11, 1962.

The present invention relates to a fluidized freezer apparatus, and more particularly, to a fluidized freezer useful in the rapid freezing of food particles while suspended in a fluidized bed.

In the past, food particles have been conveyed through a freezing tunnel by some form of mechanical means, such as a conveyor belt or an oscillator operating on an inclined plate. These prior art systems, although commonly in use, have many practical deficiencies. Such devices suffer from poor heat transfer due to the fact that the food particles remain in contact with each other and with the mechanical conveying means for substantial periods of time. The frozen food particles tend to stick together and require mechanical separation from the agglomerated frozen chunks; this results in a product which does not look uniformly frozen. These prior art structures require long shut-down periods and complex cleaning operations to ensure necessary defrosting and cleanliness of the mechanical conveying means. The prior art devices usually necessitate the use of mechanical agitators or oscillators to prevent the food particles from sticking to the mechanical conveyor. Furthermore, the mechanical conveying devices take up a large amount of factory space and require high operating costs.

It is therefore an object of this invention to provide a new and improved method and apparatus for freezing food particles.

It is another object of this invention to provide a food freezer which works on the principle of fluidization.

It is another object of this invention to provide a simplified apparatus which is economical to operate, easy to clean, which is compact, which is sanitary and which use results in an improved product.

It is another object to provide a food freezer which operates fast, and continuously to produce a uniformly frozen product.

It is another object to provide a food freezer which does not require mechanical means to convey the food particles.

It is another object to provide a food freezer which does not require mechanical cluster breakers for the freezing of generally spherical food particles.

It is still another object to provide a food freezer which operates essentially frost-free.

It is another object of the present invention to simultaneously freeze and convey food particles solely by the action of refrigerated, fluidizing gas.

It is another object of the present invention to simply, easily, and very inexpensively freeze food particles, particularly those having relatively uniform dimensions in each direction.

Other objects and the nature and advantages of the instant invention will be apparent from the following description taken in conjunction with the accompanying drawings wherein:

FIG. 2 is a cut-away perspective view of the apparatus in operation;

FIG. 3 is a cut-away perspective view showing the feeding device;

FIG. 5 is a cut-away perspective view showing the entire device;

FIG. 6 is a sectional detail view showing a clamping device for clamping a fluidizing vessel to the remaining apparatus;

FIG. 7 is a sectional detail view showing the clamping device open and the vessel being removed;

FIG. 8 is a schematic vertical sectional view showing another embodiment of the apparatus;

FIG. 9 is a vertical sectional view of another embodiment;

FIG. 10 is a vertical sectional view of yet another embodiment and including a detailed view of a feeding means;

FIG. 11 is a plan view of the feeding means such as used in the embodiment of FIG. 10;

FIG. 12 is a front elevation of the feeding means of FIG. 11;

FIG. 13 is a schematic vertical section of another embodiment taken below the level of the fluidized bed;

FIG. 14 is a vertical longitudinal section of an embodiment utilizing an internal working device;

FIG. 15 is a section taken along line 15—15 of FIG. 14;

Figure 1:
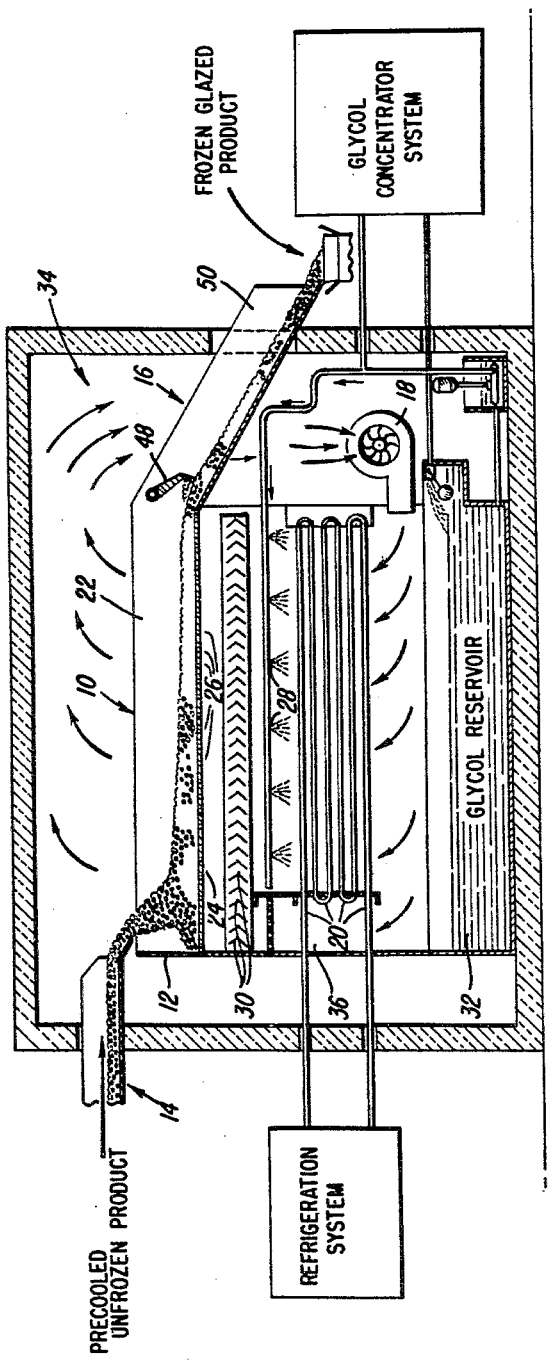
FIG. 1 is a diagrammatic illustration of the fluidized freezer and attendant apparatus.

The invention generally relates to a fluidized freezer for cooling and freezing solid food particles which are to form the fluidized bed, such freezer comprising a container having a perforated bottom through which cooled air is adapted to flow in an upward direction for maintaining the fluidized bed and which bottom is to form the lower boundary for the solid particles in the fluidized bed. Essentially characteristic of the invention is that the elongate and preferably rectangular container has its one end provided with a continuously operating device for supplying the solid particles and its other end with an exit means for the solid particles so that cooling of the solid particles can take place continuously. The freezer is particularly useful in the rapid freezing of food particles having generally uniform dimensions, i.e. small spheres or cubes, such as peas, corn, diced poultry and berries. The fluidized freezer during operation contains a constant flowing fluidized bed of food particles each individually enveloped by refrigerated gas.

In the preferred embodiment, shown in FIGS. 1–7, the fluidized freezer apparatus broadly comprises a fluidized product bed 10 which is contained by an elongate and preferably rectangular container or vessel 12, a particle food feeding device 14 adjacent one end thereof, a product removal device 16 at the other end of the container 12 and attendant refrigerated gas circulating fans 18 and refrigeration coils 20.

In operation, pre-cooled unfrozen food particles are continuously fed into the feeding device 14 which in turn continuously feeds the food particles in individual spaced relationship at a high rate into the fluidized bed 10. While in the bed 10 the particles are frozen by refrigerated gas which is continuously recirculated through fans 18 and blown past coils 20 and into the bed 10 where each food particle is randomly moved in relation to every other particle by a constantly moving enveloping cushion of refrigerated gas. The static head of food particles entering the bed at the inlet end near feeder 14 causes the particles to flow (just as a liquid would flow) to the exit end of the bed 10 near the product removal device 16 where they leave the bed as separate uniformly glazed and frozen particles.

The vessel 12 is defined by end walls 21, side walls 22 and a bottom wall 24. The side walls 22 and the bottom wall 24 contain perforations 26 through which refrigerated gas is blown in to maintain the fluidized bed.

Any gas which does not contaminate the food, such as Freon or air, may be used to freeze and fluidize the food particles; air is preferred, however, since it permits attendants to work within the insulated freezer room 34 without an auxiliary oxygen supply.

During circulation of the refrigerating air, free water on the food particles is picked up by the circulating air. To prevent the accumulation of frost on the refrigeration coils 20 and in the vessel 12 itself, glycol sprayers 28 are provided to spray glycol solution into the air above the refrigerating coils; this serves to remove water vapor from the air and frost from the coils. The glycol solution falls into a glycol reservoir 32 after passing the coils 20 and is then sent to a concentrator to remove the water from which it is returned to the sprayers for reuse.

Lying directly beneath the perforated bottom 24 are glycol eliminators 30 which comprise inverted V-shaped screen members which permit the air or gas to pass through. After the refrigerated air passes by the glycol sprayer 28, it next passes through the eliminators 30 where glycol, which has been evaporated by and entrained in the refrigerated air, is condensed on the eliminators from which it then drops into the glycol reservoir 32.

The path of the fluidizing gas is shown diagrammatically in FIG. 1 where it is seen that after leaving the fans 18, the gas is blown upwardly past the refrigeration coils 20, the glycol sprayers 28, the glycol eliminators 30 and finally through the perforations 26 in the bottom and side walls of the vessel 12 and into the vessel to there fluidize and freeze the particles contained therein. In the embodiment of FIG. 9, a cooling battery 20' is provided between the blower 18' and the container 12'.

It has been unexpectedly discovered that by providing a bypass area 36 near the entrance end of the fluidized bed where the air is blown past an area substantially free of refrigeration coils, frost accumulation within the vessel can be greatly reduced.

The vessel 12 of the fluidized bed remains entirely stationary during operation of the bed. No motion need be imparted through the container in order to either convey the particles or to keep the particles separate during freezing.

FIG. 2 shows the preferred embodiment of the apparatus in cross-section including the air-directing baffles 42. The vessel 12 comprises a structure having a cross-section generally shaped like an M and having outer walls 38, inner walls 22 having perforations 26 in their lower sections and a bottom wall 24, also having perforations 26 extending therethrough. The vessel 12 is attached to the superstructure by clamps 40 to provide easy removability for cleaning as shown in FIGS. 2, 6 and 7.

All the metal in the product circuit is preferably formed of stainless steel although plastic may also be used. Plastic has the advantages of being easily molded and being relatively non-adhesive to ice. A preferred plastic is a polyester material. Since ice adheres so difficultly to polyester, the risk of bottom freezing and the adhering of ice and food particles to the bottom 24 becomes insignificant when the bottom is formed of polyester. Moreover, such plastic materials have no unfavorable effect on food stuffs, are easily worked and can withstand the cold.

Noting FIG. 3, it is seen that the continuously operating feeder 14 comprises an oscillating plate 44 which extends over the vessel 12 and terminates in a plurality of triangular shaped flaps 46. The flaps may be curved downwardly as illustrated or may be straight as shown in FIG. 12.

The operation of the feeding device 14 is shown schematically in FIGS. 10–12. The slightly downwardly inclined plate 44 is actuated by a vibrator 45 to obtain the desired oscillation such as shown in phantom in FIG. 12. If desired, the plate 44 may be provided in longitudinal sections with only the discharge end being vibrated.

While the triangular shaped flaps 46 at the end of the vibrating plate 44 are illustrated as being equal in size and of a width tapering toward the free end thereof, such flaps 46 may be of different shapes so as to be subjected to different oscillations. Alternatively, the plate 44 may terminate in a single flap. If desired, the feeding device 14 may be formed of several juxtaposed plates which may be oscillated differently. Also, the feeding device may consist of a plurality of conveyor belts in side by side relationship each of which may reach into the container 12 a different distance. Another feeding device may consist of a single conveyor belt including some type of spreading means arranged at the end thereof, such as a rotating impeller, compressed air nozzles, an oscillating guide plate, or a grid through which the particles are forced to bounce. The purpose in each type of feeding means is to spread the supplied food particles as much as possible. The preferred feeding means is, however, that illustrated in FIG. 3.

Figure 4:
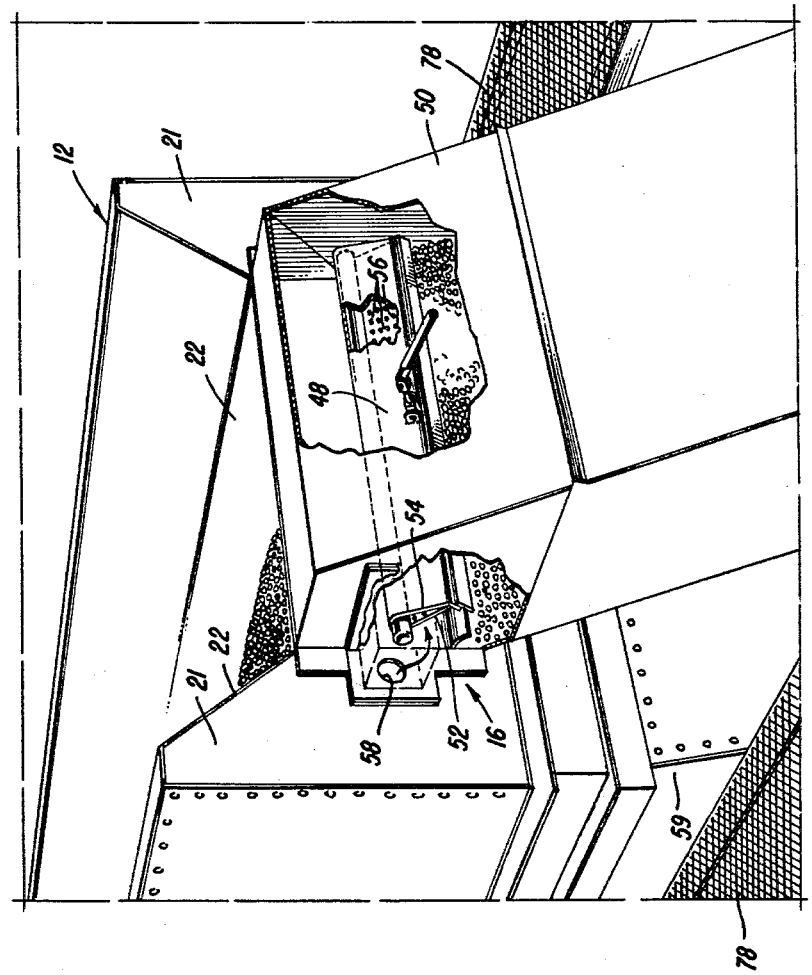
FIG. 4 is a cut-away perspective view showing the particle discharging means.

The discharge means 16, noting FIG. 4, comprises a weir-gate 48 over which the frozen particles may flow into the exit chute 50, like water over a dam. The weir-gate is constructed to be periodically opened from the bottom by suitable means to permit a mass flow of particles to escape. The weir-gate 48 has an inner wall 52 and an outer wall 54. The inner wall is provided with perforations 56 similar to the perforations 26 in the sidewalls and bottom to permit air to flow through the perforations to prevent the frozen food particles from sticking to the inner wall 52. Some of the refrigerated air blowing up between the walls 22 and 38 flows through the apertures 58 located on either side of the weir-gate 48 in the discharge end wall 21 of the vessel 12; the air then flows between the walls 52 and 54 of weir-gate 48 and then out the perforations 56.

As previously stated, the vessel 12 is removable from the remainder of the system to provide for simplified cleaning with a minimum shut-down time. The vessel 12 is attached to a support or superstructure 59 through the clamping devices 40 which act through L-bars 60 integrally united to the walls 38 of the vessel 12. Along the inner surface of the walls 38 projecting inwardly and extending the length of walls 38 are L-bars 62 which serve to support the vessel 12 upon gaskets 64 of the superstructure 59 which in turn rest upon C-beams 66 of the superstructure 59. When it is desired to clean the vessel 12, the clamps 40 are simply released as shown in FIG. 7, the vessel is raised off supports 64–66 by trolley hoists 70 acting through hooks 72 on vessel 12. The door 74 to the insulated room 34 is opened and the trolley hoists travel along the track 76 to a position outside the insulated room where the vessel is then removed to a cleaning station (not shown). While the vessel is being cleaned another vessel may be placed in position thus minimizing the shut-down time.

In FIG. 5, the insulated room 34 is shown containing a platform 78 and a door 80 which permit attendants to work therein.

In the embodiment illustrated in FIG. 8, the walls 22' of the container are inclined outwardly from the bottom 24' so that the cross section of the container successively increases upwardly. This construction will give a favorable flow ratio of gas used under the proper conditions.

As previously indicated, in order to eliminate the risk of the food particles freezing together into lumps, it is important that such food particles be supplied to the container in separated relationship. In the embodiment of FIG. 9, a supply device 14' is arranged, in connection with the feeding of the particles into the container 12', to spread such particles over the surface of the container so that they are delivered to the bed 10 in spaced apart relationship. If desired, the supply device or feeding means 14' may be provided for this purpose with a distribution mechanism 9 for the particles, consisting of a sieve or like means so that the particles are supplied to the container 12' in the form of an evenly distributed "spatter."

As previously indicated, the purpose of the perforations 26 in the side wall of the container is to eliminate the possibility of food particles from freezing to the side walls of the container and agglomerating into lumps. When refrigerated air blows through the holes 26 there is formed between the food particles and the side walls 22 of the container a layer of air or cushions of air which prevent the particles from freezing to such side walls. The size of the perforations 26 should be adapted to the height thereof above the bottom 24 so that the correct flow ratio is obtained, which is of particular importance when the side walls 22 are provided with perforations 26 all the way up to the upper surface of the fluidized bed 10.

In the embodiment of FIGS. 14 and 15, the apparatus is equipped with a mechanical working device 95 for the particles within the container. Such a working device preferably includes U-shaped or like members 96 for engaging the particles. An oscillating device 97 is provided to move the U-shaped members back and forth within the stationary container. This device has its particular use where the fluidization of larger, oblong articles is carried out. Oblong particles, such as stringbeans or French fried potatoes, may have a tendency to freeze together and such a mechanical working device is useful in preventing the formation of large frozen clumps.

In certain instances it may be desirable to increase the height of the bed 10 from the supply end to the discharge end thereof. This is most simply accomplished by inclining the perforated bottom 24' of the container in a downward direction from the feeding end to the discharge end thereof such as shown in FIG. 9. The inclination may be proportional to the loss of heat of the particles or to a desired increase in volume at the discharge end.

FIG. 10 shows another embodiment for the discharge end of the fluidized freezer. Besides the primary product removable device 16' which serves as a dam over which a certain level of frozen particles flow, the container 12' is provided with a secondary outlet 23 immediately above the perforated bottom 24' of the container near the discharge end thereof. Through this outlet 23 the container can be emptied when it is desired to interrupt the fluidization. In addition, a given part of the fluidized solid particles can escape during fluidization through such outlet 23, while the remainder of the solid heavy particles leave by the overflow outlet 16'. In certain cases all the particles, during continuous operation, may be caused to leave the container through the outlet 23. The outlet 23 may have a valve 21 which preferably is a sluice valve. This sluice valve 21 serves as a discharge means for the solid particles, and the amount of discharge is determined by the speed of the sluice valve 21. The speed thereof is adjustable and may, for example, be made dependent on the supply speed of the continuously operating feeding means.

Figure 16:
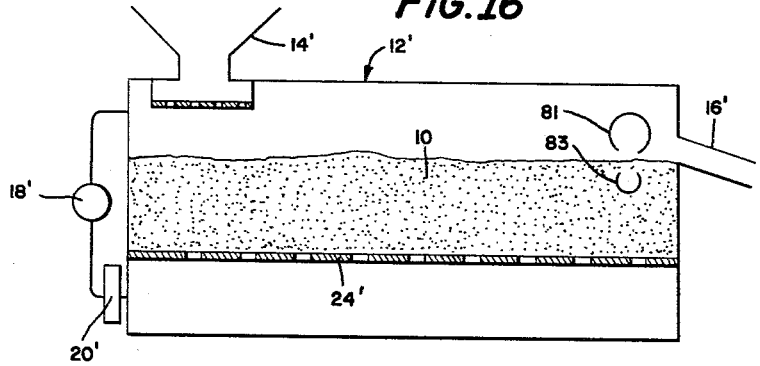
FIGS. 16 and 17 are partly broken away sectional views of different embodiments of a perforated bottom utilized in the present invention.
Figure 17:
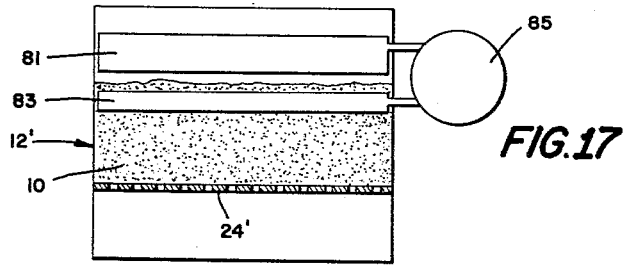
Figure 18:
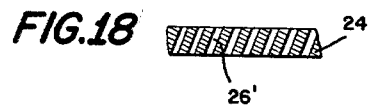
FIGS. 18 and 19 are partial vertical sections of other embodiments of the container bottom.
Figure 19:
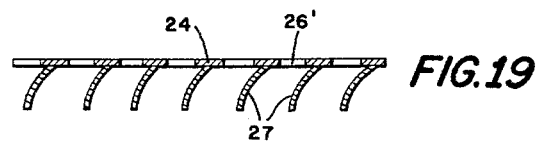

In the embodiment shown in FIGS. 16 and 17 the fluidized freezer is of such a design that a calm fluidizing zone is obtained adjacent the discharge end of the container 12' so that light weight undesired particles collect in said zone. Disposed above the calm zone is a suction means 81 which is adapted to carry away such light weight undesired particles. The container 12' is provided with a blowing means 83 below the suction means 81 and adapted to blow towards the suction means 81. Preferably the blowing means 83 is connected to the same fan system 85 as is the suction means 81, and a cyclone separator or other such means can be inserted into the line after the suction means 81 for collecting the undesired solid particles.

In the embodiment of FIG. 13, the space beneath the perforated bottom of the freezer container, as viewed in the longitudinal direction of the container, is divided into sections 86, 87 and 88 which have controlled connections for the refrigerated gas. Thus the container can be supplied with a greater quantity of cooled gas at the supply end than at other points, since the newly supplied products require a greater quantity of air than the remaining products. Such controlled feeding of refrigerated gas can be regulated in any manner as is desired to obtain different patterns of cooling. The fans 90, 91 and 92 for the refrigerated air are connected to each container section 86, 87 and 88, respectively, the air being supplied to the fans 90–92 by a main fan 18' common to the other fans.

In certain cases the perforated bottom 24 should be designed in such a manner that the air flowing therethrough is forced in a desired direction. Thus the holes 26' in the relatively thick bottom 24, shown in FIG. 16, make an angle to the horizontal plane. In the embodiment shown in FIG. 17, the perforated container bottom 24 is very thin and refrigerated air is directed in the desired direction by providing relatively large holes 26' beneath which are provided air directing baffles or vanes 27 to direct the refrigerated air in the desired direction.

Since the fluidized freezer may be utilized for both glazing and freezing of food particles, it may be advantageous to separate the freezing and glazing functions of the container. The amount of gas required for cooling will generally be greater than that required for the fluidization itself, and as a consequence, the cooling may in certain instances become unnecessarily expensive. To make the cooling cheaper it may be desirable to provide the vessel 12' with one or more cooling batteries (not shown) in a manner analogous to that of FIG. 13, where more than one fan is shown, so that the amount of air required, where cooling batteries are provided, is determined by the fluidization only. However, it is desired that cooling batteries not be placed within the interior of the container where glazing takes place, since such batteries may cause the peas to freeze together in lumps and against the batteries since the glazing requires cooling to the freezing point of water. After the glazing is completed there is practically no risk that peas will freeze together. Therefore, if a cooling battery 20' is placed within the container, it should be placed closest to the outlet end of the container.

The container 12' may be divided longitudinally into two parts, the first of which is intended for glazing and the second for the freezing of peas. In this case, only the second part need be provided with internal cooling batteries. The portions may be separated by a partition or like means serving as an overflow.

It is of the utmost importance to the intended treatment, which primarily is the freezing of wet particles such as peas, berries and like products, that all particles be held in relative motion, i.e. a complete fluidization is maintained, from the time the particles reach the bed at least up to the time they have been frozen on the surface, since this will avoid the freezing of the wet particles into lumps.

The continuous freezing of foods, such as peas and berries, by means of the fluidization principle, involves a number of specific problems not met in other fields of application of the fluidization technique, such as roasting, catalytic cracking or drying. This resides in the fact that the particles fluidized in the present invention are of large size, about ⅜ of an inch in diameter for peas, as compared to sizes of the order of 50 to 500 microns in other types of fluidization processes. This results in an inhomogeneous type of fluidization. In addition, freezing of initially wet particles necessitates special measures to prevent the particles from freezing together into lumps, and to prevent ice formation on the bottom and sides of the fluidization vessel. The present apparatus has proved successful in obtaining the desired results set forth above.

It will be obvious to those skilled in the art that various changes may be made without departing from the scope of the invention and therefore the invention is not limited to what is shown in the drawings and described in the specification but only as indicated in the appended claims.

What is claimed is:

1. A method of freezing solid food particles comprising:
   (a) feeding the said particles into a container;
   (b) creating a fluidized bed of said particles solely by forcing refrigerated gas upwardly therethrough and therearound to achieve discrete glazing and freezing of said particles;
   (c) providing a fluid head of fluidized particles at one end of said container by further feeding more particles at said one end to thereby achieve flow of said particles from said one end of said container to the other end thereof simultaneously with the fluidization; and
   (d) removing the then frozen particles from the container.

2. A method of freezing solid food particles comprising:
   (a) introducing the solid food particles into a feeding device;
   (b) continuously feeding the solid food particles into a fluidized bed in substantially spaced relationship, said bed being bounded by a longitudinal container provided with a perforated bottom, the bed comprising a fluidized mixture of individual food particles in relative and rapid motion and refrigerated gas, said continuous feeding providing a fluid head of particles in said fluidized bed at the area of infeed;
   (c) continuously blowing refrigerated gas upwardly at a high rate through said perforations thereby simultaneously fluidizing, freezing and blowing the individual food particles the length of the container, there being substantially no contact between the particles and the container; and
   (d) removing the individually frozen solid food particles from the end of the container opposite the infeed.

3. Apparatus for discrete freezing of solid particles such as peas, beans, berries, and the like, comprising in combination; an elongated container for the particles to be frozen including bottom, side and end walls, at least said bottom wall being perforated over substantially its entire surface; means to feed the solid particles to said container at one end thereof; means for discharging the solid particles from said container at the other end thereof; blowing means for forcing a refrigerated gaseous medium at temperatures substantially below freezing upwardly through said container at a sufficient velocity to create a true fluidized bed of the particles to be frozen; refrigeration means for cooling said gaseous medium; and means mounting said container in stationary relation to said refrigeration means.

4. A fluidized bed freezer for freezing individual solid food particles which particles form the fluidized bed, said fluidized bed freezer comprising: a longitudinally extending container having a stationary mounted perforated bottom, said bottom forming the lower boundary for the solid food particles in the fluidized bed; means for forcing refrigerated gas in an upward direction through said perforated bottom to maintain the fluidized bed and simultaneously freeze and convey the food particles, said means comprising the sole food conveying means; refrigeration means located outside said container to effect refrigeration of the gas; means to feed the food particles to the fluidized bed at one end thereof; and means for discharging the individually frozen food particles from the fluidized bed at the other end thereof.

5. The fluidized food freezer of claim 4 wherein the walls of said container are provided with perforations near the bottom to permit the flow of refrigerated gas through said wall perforations.

6. The fluidized food freezer of claim 4 wherein said means for forcing refrigerated gas comprises separate elements to supply gas under different conditions along the length of the container.

7. The fluidized food freezer of claim 4 wherein said perforated bottom comprises means to impart direction of flow to the gas.

8. The fluidized food freezer of claim 4 wherein said container is partitioned into a glazing section and a freezing section.

9. The fluidized food freezer of claim 4 wherein said feeding means comprises an oscillating plate having its free end divided into several juxtaposed triangular shaped flaps.

10. The fluidized food freezer of claim 9 wherein said oscillating plate is downwardly inclined.

11. The fluidized food freezer of claim 4 wherein said discharging means comprises an outlet near said perforated bottom, said outlet comprising valve means.

12. The fluidized food freezer of claim 4 wherein said perforated bottom inclines downwardly from said feeding means to said discharging means.

13. A fluidized bed freezer for freezing individual solid food particles which particles form the fluidized bed, said fluidized bed freezer comprising; a longitudinally extending stationary container having side walls and a perforated bottom, perforations extending partly up the side walls, said bottom forming the lower boundary for the solid food particles in the fluidized bed, means for forcing refrigerated air in an upward direction past the refrigeration means and through said perforated bottom to maintain a true fluidized bed and simultaneously freeze and convey the food particles, said refrigeration means being located outside the container, said container having at one end feeding means comprising an oscillating plate having its free end divided into juxtaposed triangular shaped flaps, and at the other end means for discharging the individually frozen food particles from the fluidized bed.

14. The fluidized food freezer of claim 4 wherein the walls of said container area inclined outwardly from the bottom.

15. The fluidized food freezer of claim 4 wherein said container contains a mechanical agitating member to mix the food particles within the fluidized bed.

16. The fluidized food freezer of claim 4 wherein said refrigeration means is located in the path of the gas subsequent to said means for forcing the refrigerated gas.

17. The fluidized food freezer of claim 13 comprising means placed near the discharge means for removing lightweight undesired particles.

18. The fluidized food freezer in accordance with claim 4 further comprising means to remove said container from said refrigeration means.

19. The fluidized food freezer in accordance with claim 4 wherein said perforated bottom is horizontal.

20. The fluidized food freezer of claim 4 wherein said refrigeration means comprises heat transfer cooling coils and a glycol sprayer positioned above said cooling coils to spray glycol on said coils to remove frost therefrom.

21. The fluidized freezer of claim 20 wherein a glycol eliminator is placed above said glycol spray to remove any entrained glycol from the refrigerated gas.

22. The fluidized freezer of claim 21 wherein the cooling coils are spaced from an area adjacent said feeding means to provide an air by-pass.

23. The fluidized freezer of claim 9 wherein the triangular shaped flaps on the feeding means are curved downwardly.

24. The fluidized freezer in accordance with claim 4 wherein said means for discharging the individually frozen food particles comprises a weir-gate.

25. The flulidized freezer in accordance with claim 24 wherein said weir-gate comprises a perforated wall.

26. The fluidized freezer of claim 25 wherein said weir-gate is provided with means to open said weir-gate at its bottom and permit the product to escape at the resulting space.

27. A fluidized bed freezer for freezing individual solid food particles which particles form the fluidized bed, said fluidized bed freezer comprising a removable longitudinally extending stationary vessel having perforated side walls and a substantially horizontal perforated bottom, said bottom forming the lower boundary for the solid food particles in the fluidized bed, means for forcing refrigerated gas in an upward direction through said perforated bottom and walls to maintain the fluidized bed and simultaneously freeze and convey the food particles, heat transfer cooling coils located outside of said vessel and in the path of said gas to effect refrigeration of the gas, a glycol spray positioned above said cooling coils to spray glycol on said coils to remove frost therefrom, a glycol eliminator positioned in the path of the refrigerated gas between said glycol spray and said perforated bottom to remove entrained glycol from the refrigerated gas, food particle feeding means positioned adjacent one end of said vessel to continuously feed food particles to the fluidized bed in substantially spaced apart relationship, and a perforated weir-gate positioned adjacent the other end of said vessel to discharge individually frozen food particles from the fluidized bed.

References Cited by the Examiner

UNITED STATES PATENTS

| | | | |
|---|---|---|---|
| 2,175,680 | 10/39 | Bedford | 62—64 |
| 2,223,972 | 12/40 | Sterling | 62—57 |
| 2,300,229 | 10/42 | Knowles | 62—378 |
| 2,343,767 | 3/44 | Getz | 62—380 X |
| 2,385,140 | 9/45 | Knowles | 62—63 |
| 2,402,921 | 6/46 | Sharpe | 62—380 X |
| 2,519,148 | 8/50 | McShea | 62—63 |
| 2,568,891 | 9/51 | Kals | 62—282 |
| 2,686,407 | 8/54 | Zellner | 62—282 |
| 2,824,723 | 2/58 | Turney | 165—109 |
| 2,923,138 | 2/60 | Rollins | 62—282 |
| 3,035,918 | 5/62 | Sorgenti | 99—100 |

FOREIGN PATENTS

| | | |
|---|---|---|
| 8,081 | 1906 | Great Britain. |
| 884,346 | 12/61 | Great Britain. |
| 888,649 | 1/62 | Great Britain. |

OTHER REFERENCES

German printed application No. 1,113,862, 9/61.

EDWARD J. MICHAEL, *Primary Examiner.*